Fig. 1.

Oct. 29, 1946.　　　F. E. BERTRAND　　　2,410,004
INSOLE MACHINE
Filed Jan. 15, 1945　　　8 Sheets-Sheet 2

Fig. 2

Inventor
Frederic E. Bertrand
By his Attorney

Fig. 3

Oct. 29, 1946.   F. E. BERTRAND   2,410,004
INSOLE MACHINE
Filed Jan. 15, 1945   8 Sheets-Sheet 4

Inventor
Frederic E. Bertrand
By his Attorney

Oct. 29, 1946.  F. E. BERTRAND  2,410,004
INSOLE MACHINE
Filed Jan. 15, 1945  8 Sheets-Sheet 5

Inventor
Frederic E. Bertrand
By his Attorney

Oct. 29, 1946. F. E. BERTRAND 2,410,004
INSOLE MACHINE
Filed Jan. 15, 1945 8 Sheets-Sheet 7

Inventor
Frederic E. Bertrand
By his Attorney

Fig. 22
Fig. 21

Patented Oct. 29, 1946

2,410,004

UNITED STATES PATENT OFFICE 2,410,004

INSOLE MACHINE

Frederic E. Bertrand, Lynn, Mass., assignor to United Shoe Machinery Corporation, Flemington, N. J., a corporation of New Jersey Application January 15, 1945, Serial No. 572,890

53 Claims. (Cl. 12—17)

This invention relates to machines for adhesively attaching strips to insoles and particularly to machines for attaching ribbed strips to insoles to provide sewing ribs thereon.

In some respects the illustrated machine is similar to that disclosed in Letters Patent of the United States No. 2,326,119, granted August 10, 1943, upon my application.

Objects of the invention are to provide an improved machine of this type by which strips having wide inner flanges may be satisfactorily applied and by which, about the curved portions of the insole, the wide flange may be so handled as to avoid the formation of wrinkles therein.

Various forms of strips having wide inner flanges which the illustrated machine is adapted to attach to insoles are disclosed in Letters Patent of the United States No. 2,381,951, granted August 14, 1945, in the name of Stanley M. Griswold.

Other objects of the invention are to insure proper adhesion of the wide flange to the insole, to enable the strip to be severed at the conclusion of the applying operation, and to remove an edge corner of the insole, that is, the corner which will be uppermost when the insole is incorporated in a shoe, during the operation of applying the strip to the insole.

A feature of the invention consists of a single means under control of the operator for either slitting the inner flange of the strip or removing a portion thereof prior to its attachment to the insole, thus facilitating the application of the ribbed strip to curved portions of the margin of an insole. As illustrated, said means comprises a knife L-shaped in cross-section which co-operates with shearing edges constructed and arranged so that a short reciprocation of the knife will cause it to slit the inner marginal portion of the strip and a longer reciprocation thereof will cause the knife to make an L-shaped cut in the strip, which cut, being repeated intermittently, will remove a portion of the inner flange of the strip.

Another feature of the invention consists in reciprocating means for hammering or beating down the wide inner margin of the strip which preferably has a component of movement toward the rib, said means having a portion which treats the inner margin of the strip arranged to be thrown into and out of operation.

Another feature of the invention comprises means under control of the operator for imparting to the knife a short stroke to slit the inner margin of the strip or a long stroke to remove the margin entirely. Preferably and as illustrated, said means is mechanically connected to the means for hammering the inner margin of the strip so that, when the knife is given its full stroke to remove the margin of the strip, the hammering means will be ineffective and thus sticking of the several pieces of the strip to the insole will be prevented.

As a further feature of the invention, the illustrated machine is equipped with a knife for severing the strip at the end of the strip-applying operation which acts from the inner portion of the insole toward its edge and severs the strip without cutting into the insole.

A further feature of the invention consists in the provision of means for chamfering the edge corner of the insole which will be uppermost when the insole is anchored in a shoe and which is the lower corner of the insole as it is operated upon in the machine. This is effected by a knife associated with an edge gage. This combination permits the chamfering operation, which is desirable but is often neglected, to be performed in conjunction with that of applying the strip, thus avoiding a separate operation upon the insole.

These and other features of the invention will appear more fully from the following description when read in connection with the accompanying drawings and will be pointed out in the appended claims.

Figure 20:
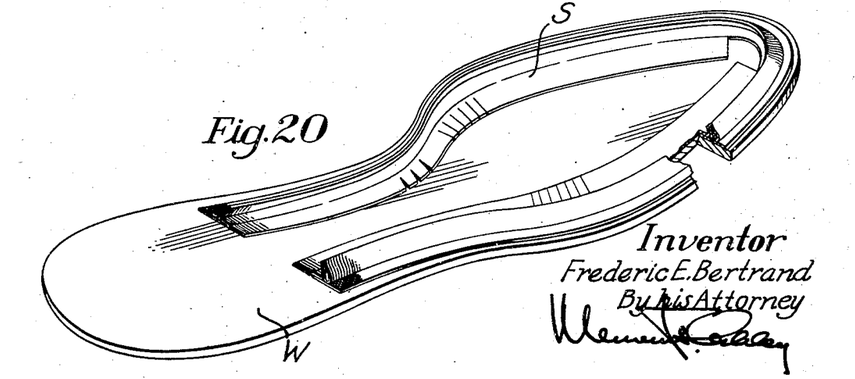
Fig. 20 is a perspective view of an insole which has been operated upon by the machine.

The illustrated machine is for applying to insoles ribbed strips such as those disclosed in the Griswold application referred to, thereby producing the product shown in Fig. 20.

The machine, in its general organization, resembles in some respects that disclosed in my patent referred to above, for example, the work support and edge-gage-shifting mechanism. Reference may be had to the patent for a more detailed description of these and other parts than will be found herein.

Figure 1:
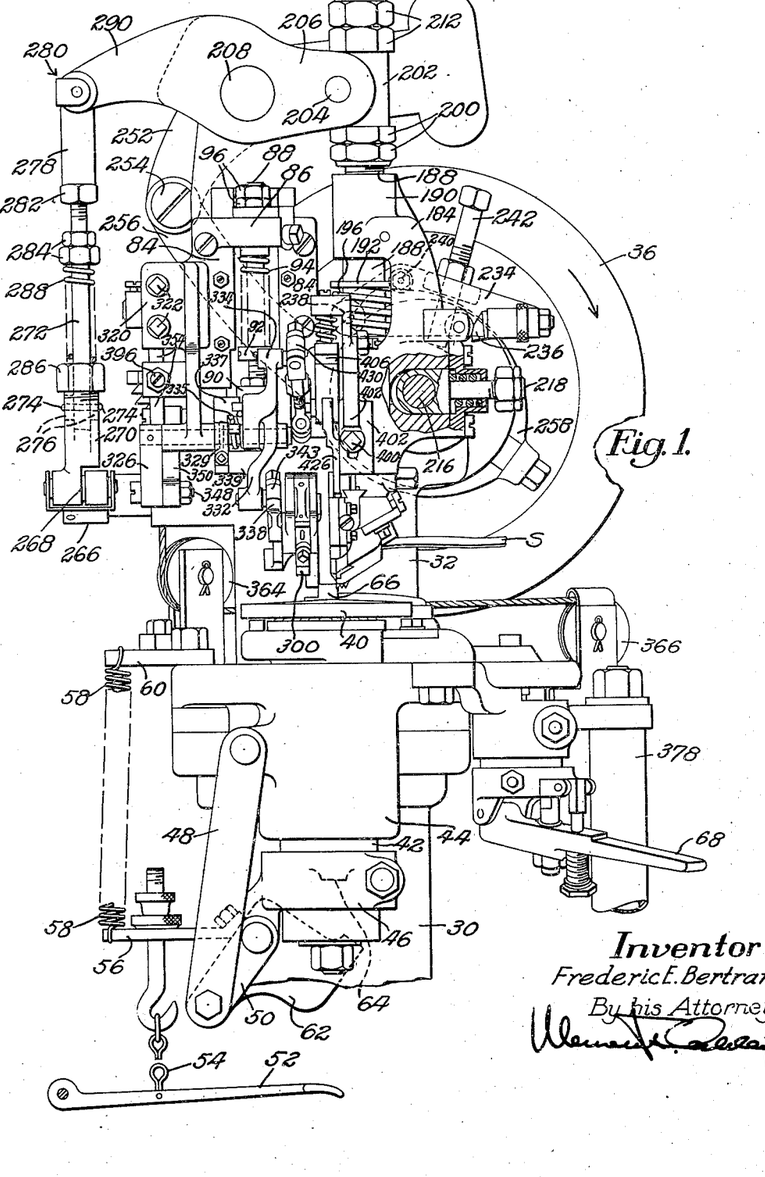
Fig. 1 is a front elevation, partly in section, of a machine embodying my invention.

Referring to Fig. 1, the machine has a column 30 resting on the floor and a head frame 32 in which is journaled a main drive shaft 34 (Fig. 2) from which the operating instrumentalities are driven, the shaft having thereon a pulley 36 for belt connection to a source of power through suitable control mechanism for starting and stopping the machine.

The work support comprises a table 40 rotatably mounted on a stem 42 arranged to slide vertically in a sleeve 44 projecting forwardly from the head frame 32. Connected between the sleeve 44 and a collar 46 secured to the stem 42 is an inverted toggle comprising double links 48, 50, so that straightening of the toggle will raise the table 40 and sustain it rigidly. Straightening of the toggle may be effected by depressing a treadle 52 (Fig. 1) connected by a chain 54 to an arm 56 secured to the shorter link 50 of the toggle. The toggle is normally held in broken position by a tension spring 58 connected between the arm 56 and an arm 60 secured to the head frame 32. An arm 62 on the link 50 engages a surface 64 on the rear side of the collar 46 to limit movement of the toggle when it reaches its straightened position.

Figure 3:
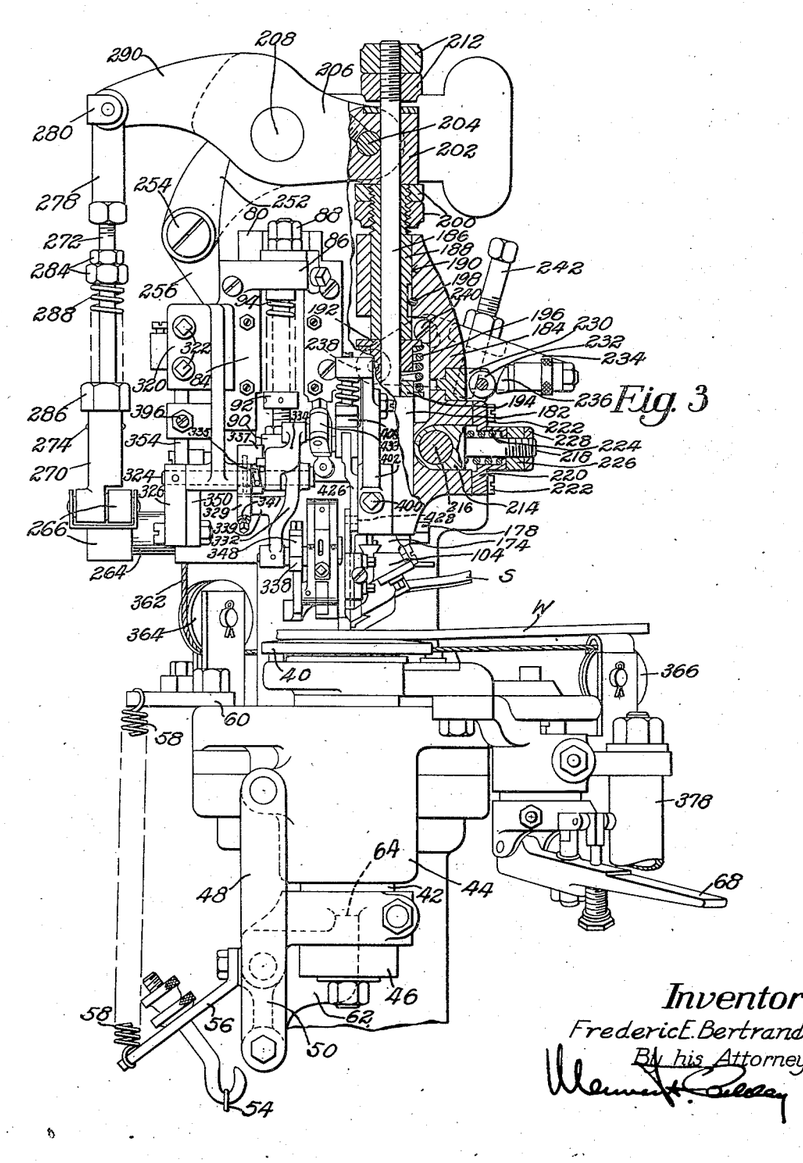
Fig. 3 is a view similar to Fig. 1 with the parts in position for operating upon an insole.

The work, for example an insole W with its toe end extending to the right, is placed on the table 40 (Fig. 3) with its edge at the breast line against an edge gage 66 which is mounted and arranged for adjustment to vary the position of the strip S with respect to the edge of the insole by a hand lever 68, as is fully disclosed in my prior patent referred to above.

Depression of the treadle 52 raises the work support to press the insole and the outer flange of the strip against a yielding presser member 70 (Fig. 2) having a face 72 (Fig. 7) slightly inclined to the plane of the table to intensify pressure on the outer flange adjacent to the rib and an inclined face 74 to engage the outer face of the rib R of the strip which is usually inclined inwardly with respect to the insole.

The presser member 70 is secured rigidly by a screw 76 to a block 78 (Fig. 2) which has horizontal tongue-and-groove connection to the lower end of a slide 80, these parts being held together by a cap screw 82. The slide 80 is mounted in vertical ways on the head frame 32 and is held in place by front plates 84 (Fig. 1) which overlap the front lateral edges of the slide and carry gibs for engaging the slide. The plates 84 are connected at their upper ends by a yoke piece 86 having a vertical hole through which a rod 88 freely passes. The lower end of the rod 88 is threaded into a forward projection 90 on the slide 80 and carries a capstan nut 92 between which and the yoke piece 86 is a compression spring 94. Downward movement of the slide in response to the spring 94 is adjustably limited by lock nuts 96 on the upper end of the rod 88 and tension of the spring 94 may be varied by turning the capstan nut 92.

Figure 8:
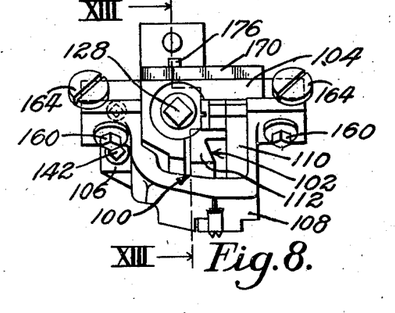
Fig. 8 is an elevation taken from the right side of the strip guide and trimming knife assembly.

The ribbed strip S, prepared in indefinite length, is wound upon a suitable reel, the end of the strip being passed through a strip guide and a trimming or slashing device shown assembled in Fig. 8. The strip S is inserted through an opening 100, the rib R lying against an inclined surface 102 defining part of the opening through the guide.

Figure 9:
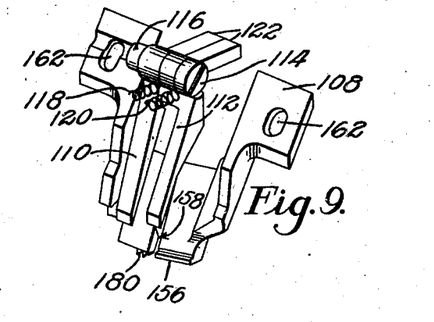
Fig. 9 is a perspective view of the outer shell of the strip guide, showing the feed pawls.
Figure 12:
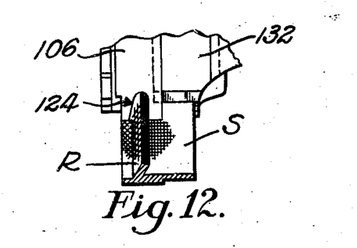
Fig. 12 is a view similar to Fig. 11 showing the strip in the guide and its relation to the trimming knife.

The assembly of Fig. 8 is in three principal parts—a body portion 104, a knife-carrying portion 106 and a guide shell 108, shown detached in Fig. 9. A pair of feed pawls 110, 112 are pivoted on a screw 114 which is threaded into a lug 116 on the shell 108. Two compression springs 118, 120 are mounted in holes in the body portion 104 (Fig. 13), the spring 118 engaging the pawl 110 below its pivot and the spring 120 similarly engaging the pawl 112, the sharpened lower ends of the pawls being thus held against the strip S which passes through the opening 100 in such a position that the pawl 110 engages the outer flange of the strip and the pawl 112 the inner flange next to the rib R which passes between the pawls, the inclined surface 102 (Fig. 8) engaged by the rib being formed on the pawl 112. The pawls 110, 112 each have a tail 122 extending to the right beyond the shell 108 by depressing which the pawls may be released from the strip either separately or together for convenience in inserting or removing the strip. The end of the strip emerges from the guide with its rib in a notch 124 formed in the knife carrier 106 (Fig. 12).

The knife carrier 106 has a horizontal tongue-and-groove connection at 126 (Fig. 13) with the body portion 104 and is secured to the body portion by a cap screw 128 (Fig. 8) which passes through a slot somewhat elongated horizontally in the body portion 104 and is threaded into the knife carrier 106. Threaded into the knife carrier is a screw 130 (Fig. 11) having a cylindrical head seated in a groove which fits it in the body portion 104 so that turning the screw will afford fine adjustment of the knife carrier 106 relatively to the body portion along its tongue-andgroove connection 126 for a purpose to be explained.

Figures 10, 13:
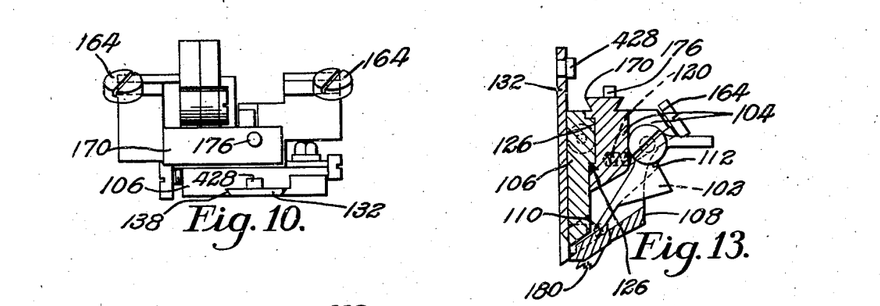
Fig. 10 is a plan view of the parts shown in Fig. 8, the guide shell being omitted.
Fig. 13 is a sectional view taken on the line XIII—XIII of Fig. 8.
Figure 11:
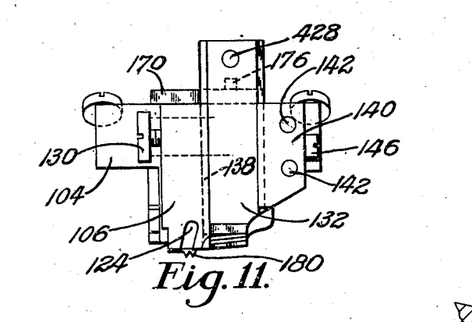
Fig. 11 is an elevation, taken from the left side, of the parts shown in Fig. 10.
Figure 14:
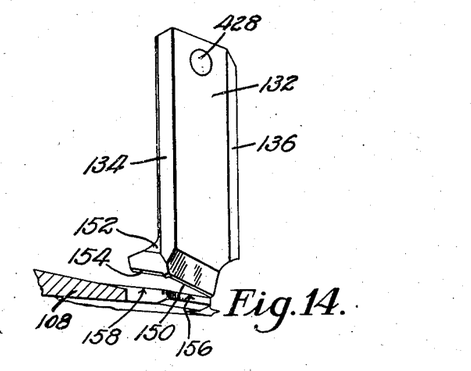
Fig. 14 is a perspective view of the trimming knife, showing the relation of its cutting edges to the co-operating parts of the shell shown in Fig. 9.

A knife 132 is mounted for vertical reciprocation in the knife carrier 106. The knife (Fig. 14) has beveled side edges 134, 136, the edge 134 engaging an undercut groove 138 in the carrier (Fig. 10). The edge 136 is engaged by a gib 140 (Fig. 11) having a beveled edge complementary to that of the knife. The gib is held in place by two screws 142 which pass through horizontally elongated holes in the body portion 104 and are threaded into the gib. A screw 146 is threaded into the carrier so that its head will engage the gib. Thus, there is provided a fine adjustment of the gib toward and from the knife to obtain a running fit for the knife in its guideway and to take up wear. The lower end of the knife 132 is sharpened by an outside bevel to a cutting edge 150 (Fig. 14) at substantially right angles to the direction of movement of the knife. On the back of the knife is a projection 152 sharpened to an edge 154 at right angles to the edge 150. The edge 150 co-operates with an edge 156 on the shell 108 (Fig. 9) and the edge 154 co-operates with an edge 158 formed on the shell but in a plane at right angles to the plane of the edge 156. The relation of the knife and these edges is illustrated in Fig. 14. When in the machine, the edge 156 is inclined downwardly and rearwardly and the edge 158 is inclined downwardly and to the left, making an angle of about 10° with the knife edge 154. Therefore, with the wide flange of the strip S lying between the knife edges 150, 154 and the co-operating edges 156, 158 of the guide shell, a relative movement of the knife and the shell will cause the knife to cut into the flange and the cut will begin at the inner edge of the strip with respect to the insole, that is, at the edge next to the front of the machine.

If the relative movement of the knife and the shell is short, the result will be that successive slits will be made in the inner margin of the strip which will facilitate the laying of the strip along the curved sides of the insole whether the curve is convex or concave. If, however, the relative movement between the knife and its co-operating edges is greater, both edges of the knife will cut through the margin of the strip, making therein an L-shaped slit. The feed movements of the strip through the guide are less than the length of the edge 154 and therefore, as the relative cutting movement is repeated after each feed movement of the strip, the inner margins of the strip will be completely cut away.

This action is desirable when the strip is being applied at the toe end of the insole to avoid the formation of a bunch of pleats in the margin of the strip. The edges 156, 158 are inclined at about 10° to the knife edges 150, 154 so that the edges act to produce a shear cut beginning at the free end of the edge 150 and progressing toward its point of intersection with the edge 154 and thence to the free end of the edge 154.

The shell 108 is secured to the body portion 104 by screws 160 (Fig. 8) which extend through vertically elongated holes 162 in the shell (Fig. 9) and are threaded into the body portion 104. Screws 164 (Fig. 8) are threaded into the body portion with their heads engaging the shell so that when the screws 160 are loosened the screws 164 may be turned to adjust the edge 156 toward the knife to establish and maintain, when the screws 160 are tightened, the proper cutting relation between the edge 156 on the shell and the edge 150 on the knife. Likewise, by loosening the screw 128 and turning the screw 130 the cutting edge 154 may be moved toward or from the co-operating edge 158 of the shell to adjust and maintain, by tightening the screw 128, the proper cutting relation between these cutting edges.

Figures 21, 22:
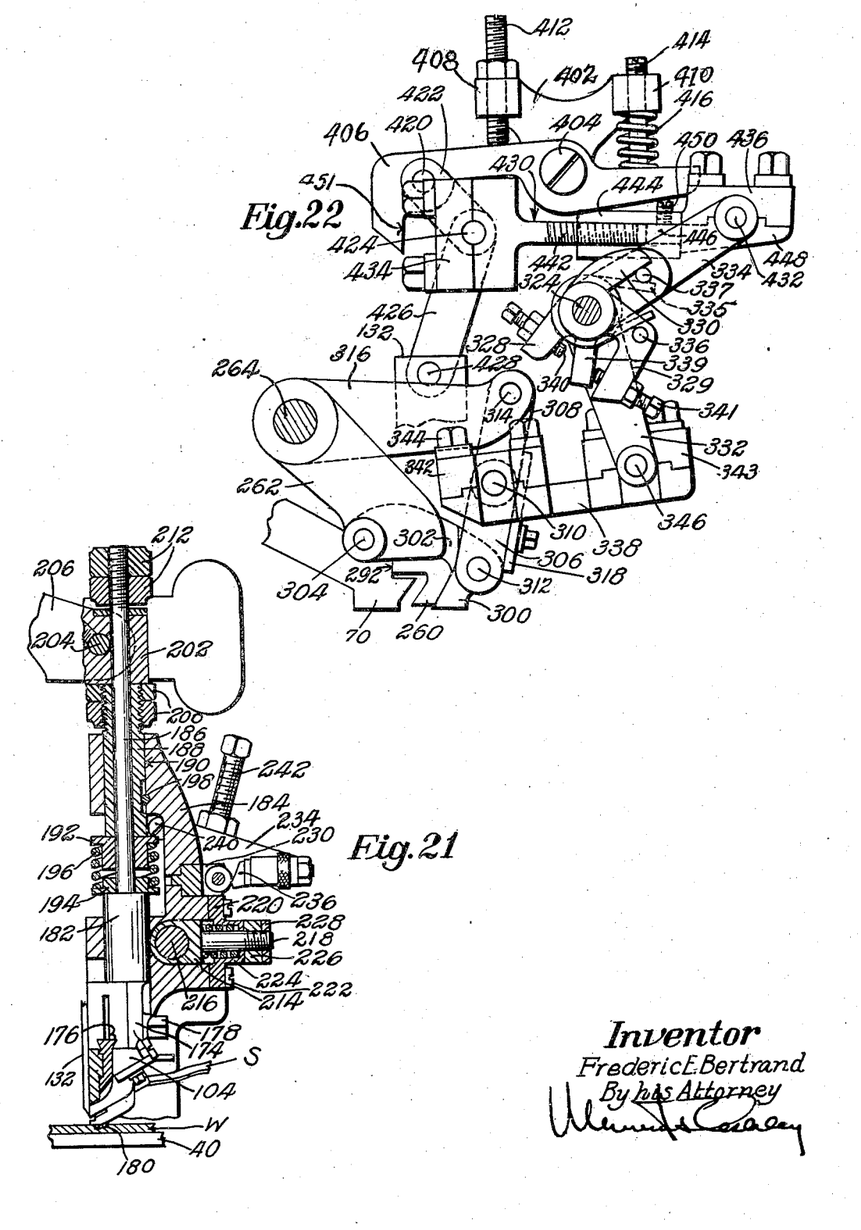
Fig. 21 is a front view, partly in section, of the strip guide and its operating mechanism.
Fig. 22 is a side view, on an enlarged scale, of the mechanism for operating the knife and presser toggles.

The body portion 104 is provided with a dovetail 170 (Figs. 8 and 13) which is inserted in a similarly shaped dovetail groove in the split lower end of a strip-guide-carrying rod 174 (Figs. 3 and 21) as far as permitted by a stop pin 176, the split end being clamped on the dovetail 170 by a screw 178. The lower end of the shell 108 is provided with a feed foot 180 which is operated to engage the insole and to feed it at the same time that the strip is fed by the pawls 110, 112. The mechanism by which positive upward and yielding downward movements are imparted to the feed foot 180 will now be described. As shown in Fig. 21, the guide-carrying-rod 174 has a cylindrical portion 182 arranged to slide up and down in a bearing on a yoke 184 and a reduced portion 186 carrying a sleeve 188, which sleeve fits another bearing 190 on the yoke 184. The reduced portion 186 of the rod has slidingly arranged thereon two oppositely disposed, flanged sleeves 192, 194 between the flanges of which is a compression spring 196. The flanged sleeve 194 bears against the upper end of the cylindrical portion of the rod, and the sleeve 192 engages the lower end of the sleeve 188 which is prevented from rotation by a pin 198 mounted in a groove in the yoke 184 and engaging the flat surface on the sleeve 188. The upper end of the sleeve 188 projects beyond the bearing 190 and is threaded to receive lock nuts 200 the upper one of which engages a block 202 pivoted by a pin 204 to bifurcations on an arm 206 fixed to a rocker 207 (Figs. 1 and 2) mounted on a fixed shaft 208. The reduced portion 186 (Fig. 21) of the carrier rod 174 extends through the block 202 and its upper end carries two set nuts 212 threaded thereon. With this construction it will be seen that upward movement of the arm 206 will positively raise the carrier 174 and that downward movement of the arm will depress the sleeve 188 and, acting through the spring 196, will yieldingly depress the carrier 174 and, of course, the strip-guide since the body portion 104 thereof is fixed to the carrier. The feed foot 180 on the strip guide shell 108 is also depressed yieldingly.

The yoke 184 is operated to impart to-and-fro or feed movements to the carrier 174, the strip guide assembly (Fig. 8) and the feed foot 180 carried thereby. For this purpose (Fig. 21) the yoke has mounted for horizontal sliding movement therein a block 214 which is engaged by a pin 216 mounted eccentrically on the shaft 34 (Fig. 2) which imparts up-and-down and to-and-fro movements, that is, orbital movement, to the yoke 184. The block has a stem 218 (Fig. 3) extending through a retaining plate 220 held by screws 222 to a face on the yoke 184. The plate 220 is counterbored to receive a compression spring 224 one end of which rests against the block 214 and the other end against the plate. The stem 218 extends far enough beyond the plate to receive a collar 226 and a nut 228. It will be seen that the nut limits movement of the block in response to the spring 224 and that, if movement of the yoke 184 to the right is arrested, the spring will yield. With the mechanism thus far described, it will be seen that the yoke 184 will receive its full orbital movement from the eccentric pin 216, the yoke sliding up and down on the sleeve 188 and the cylindrical portion of the carrier 174 and swinging to and fro about the pin 204. Assuming now that the carrier 174 is moved downwardly as soon as the leftwise movement of the yoke 184 begins, the foot 180 will engage the insole and the insole will be fed the same distance as the strip is fed by the fingers 110 and 112 during the leftwise movement of the yoke 184. If, however, during the downward movement of the yoke, it is moved to the left before the feed foot 180 engages the insole, the strip will be fed farther than the insole is fed, thus avoiding tension on the strip and consequent distortion of the insole. To effect this preliminary leftwise movement of the yoke, there is mounted in a recess in the yoke 184 a bifurcated block 230 between the ears of which is pivoted a roll 232, and on an arm 234 secured to the frame is mounted a cam block 236 in position to be engaged at times by the roll 232. The arm 234 is secured to the frame by two bolts 238, 240 (Fig. 3), the bolt 240 passing through a slot in the arm so that when loosened the arm may be turned about the bolt 238 to adjust the cam block 236 vertically. This adjustment may be effected by a screw 242 threaded through the arm 234 with its lower end engaging the head frame 32.

The cam block 236 (Figs. 3 and 21) has at the left a cam face the upper part of which is farther to the right than the lower part. During the orbital movement of the roll 232 due to the action of the eccentric pin 216 on the yoke 184, the roll will first engage the upper part of the cam, the spring 224 being, if necessary, compressed. This engagement of the roll with the cam determines the movement of the feed fingers 110, 112 and strip guide body portion 104 toward the right and hence the amount which the strip will be fed when the fingers and strip guide assembly move toward the left. As the orbital movement of the yoke 184 continues, the roll 232 will move downwardly and engage the lower portion of the cam face and be moved toward the left, causing further compression of the spring 224. This occurs before the feed foot 180 engages the insole and hence the insole is fed a less distance than the strip is fed. The timing of the parts is such that the arm 206 on the rockshaft 208 will be operated to depress the carrier 174 and hence the feed foot 180 after the roll 232 has moved more or less down along the face on the cam block 236 depending on its heightwise adjustment. The portion of the leftwise movement of the yoke 184 by the eccentric pin 216 which occurs after the feed foot 180 engages the insole is utilized to feed the insole.

By adjusting the cam block vertically by the means above described, the amount of leftwise movement imparted to the strip guide by the cam 236 before the foot 180 engages the insole may be varied and hence the amount of feed movement imparted to the strip before the insole begins to be fed. After the foot 180 engages the insole, the remaining leftwise movement of the yoke 184 is imparted to the feed foot 180 to feed the insole as well as the strip. The fulling of the strip relatively to the insole thus produced prevents distortion of the insole by application of the strip thereto, as may happen if the strip is under tension when applied.

Up-and-down movements are imparted to the carrier rod 174, the strip guide and feed foot 180 in proper timed relation to the movements of the yoke 184 by oscillation of the arm 106, as above stated. For this purpose, the rocker 207 has a downwardly extending arm 252 pivoted at 254 to a connecting rod 256 formed as an extension of an eccentric strap 258 (Fig. 2) which cooperates with a cam or eccentric on the main shaft 34. Thus, the up-and-down movements of the carrier 174 are effected in timed relation to the orbital movements imparted to the yoke 184 by the eccentric pin 216 on the shaft 34. The eccentric strap 258 and its operating cam or eccentric may be of the same construction as that disclosed in my prior patent above mentioned.

Figures 5, 6, 7:
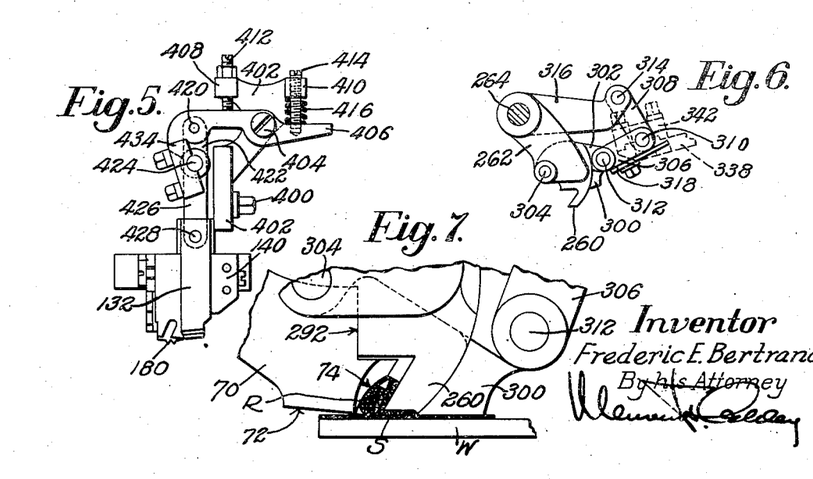
Fig. 5 is an elevation taken from the left of the trimming knife, showing mechanism for controlling its operation.
Fig. 6 is an elevational detail taken from the left side of the hammer for treating the inner margin of the flange of the strip, the hammer being in its inoperative position.
Fig. 7 is an enlarged view of operating instrumentalities of the machine taken from the left side, the insole and strip being shown in section.

The means for pressing or hammering the wide flange of the strip to effect its attachment by cement to the insole will now be described. As already indicated, when the insole is presented to the machine and the table raised by depressing the treadle 52, the feather portion of the insole and the outer flange of the strip will be pressed upwardly against the surface 72 of the yielding presser member 70. The inner flange of the strip, as illustrated in Fig. 7, has two thicknesses of material in the portion next to the rib R, and a single thickness in its inner portion, the portion of single thickness being that upon which the knife 132 acts.

The portion of double thickness should be firmly forced against the insole throughout the operation and for this purpose a presser 260 is provided. The presser 260 (Fig. 2) is formed on or secured to an arm 262 fixed to a rockshaft 264 journaled in the block 78 which is mounted on the slide 80. On the rockshaft 264 is a forwardly extending arm 266 which (Fig. 1) is connected by a universal joint 268 to a sleeve 270. The joint need not be further described since it is fully disclosed and claimed in my prior Letters Patent of the United States No. 2,173,155, granted September 19, 1939. Extending freely into the sleeve 270 is a rod 272 carrying a transverse pin 274 which engages longitudinal slots 276 in opposite sides of the sleeve 270. The upper end portion of the rod 272 is threaded and screwed into a connector 278 forming part of a universal joint 280 similar to the joint 268. The rod 272 is locked in the connector 278 by a nut 282. Between nuts 284 threaded on the rod 272 and a nut 286 threaded on the sleeve 270 is a compression spring 288 which tends to hold the pin 274 against the upper ends of the slots 276 in the sleeve 270. Tension of the spring 288 may, of course, be varied by adjusting the nuts 284. The universal joint 280 is between the connector 278 and an arm 290 rigid with the rocker 207. Movement of the arm will impart downward movement to the pressure 260, causing it to oscillate about the center of the shaft 264 which is so located (Fig. 22) that the presser has a component of movement toward the rib R to insure the application of pressure closely in the acute angle between the rib and the wide flange of the strip S, the amount of pressure being determined by the compression of the spring 288. Movement of the presser toward the rib is limited by its contact with a surface 292 on the presser 70.

The thinner inner marginal portion of the flange is acted upon by a second presser 300, referred to herein for the sake of distinction as a hammer, though its action is similar to that of the presser 260. The hammer 300 (Fig. 22) is on an arm 302 pivoted at 304 to the arm 262 and is held in operative relation to the presser 260 by a toggle comprising links 306, 308 connected by a pin 310 having a ball end. The link 306 is pivoted at 312 to the hammer arm 302, and the link 308 is pivoted at 314 to an arm 316 rigid with the rockshaft 264. Straightening movement of the toggle is limited by a plate 318 secured to the link 306. The plate, when the toggle is straight, engages the link 308 to prevent further movement at the toggle joint. When the toggle 306, 308 is straight and the presser 260 and the hammer 300 have been operated by clockwise movement of the rockshaft 264 to swing the arm 290 and arm 316 downwardly, they assume, with respect to the work, the position shown in Fig. 7 where it will be noted that the acting face of the hammer 300 is slightly below that of the presser 260 to compensate for the less thickness of the inner marginal portion of the flange upon which it operates. It will also be clear that when the toggle is broken, as in Fig. 6, the hammer 300 will be lifted out of its operative relation to the presser 260 and rendered inoperative, the presser 260 continuing to oscillate as before about the center of the shaft 264.

Figure 4:
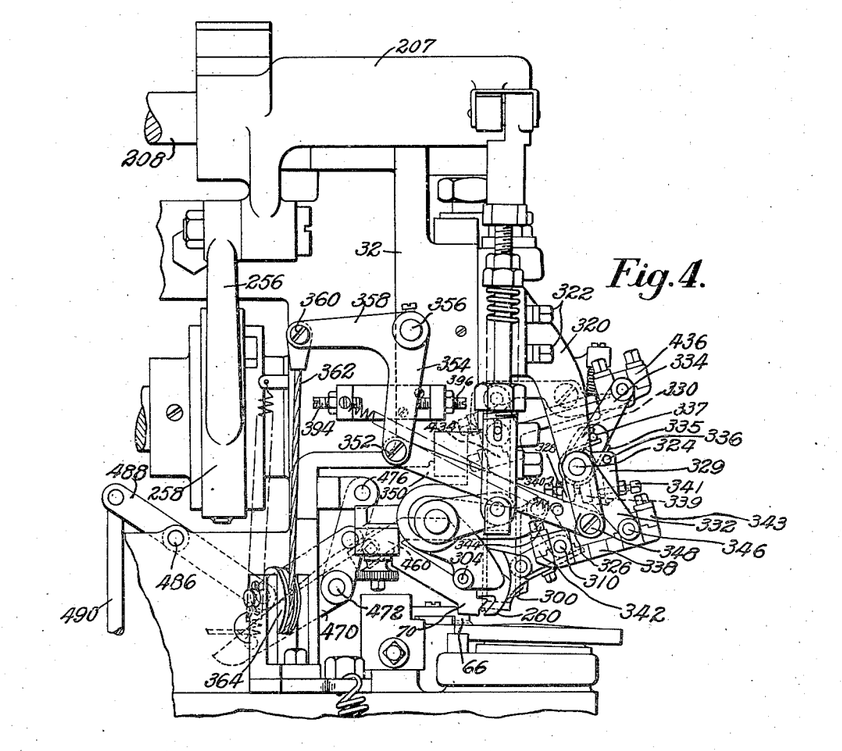
Fig. 4 is a view similar to Fig. 2 showing the hammer for treating the margin of the wide inner flange of the strip thrown out of operation and the cutting mechanism for trimming off the margin in operation.

The mechanism for controlling the toggle 306, 308 comprises a bracket 320 (Fig. 4) fixed by screws to the head frame 32. In the depending end of the bracket is journaled a rockshaft 324. Fast on the rockshaft is an operating arm 326 which is moved manually in a manner to be described. Referring now to Fig. 22 in which the bracket 320 and the operating 326 are omitted for the sake of clearness, it will be seen that there are on the shaft 324 a member having three arms 328, 329 and 330, which member is fixed to the shaft, and arms 332, 334 which are loose thereon. A torsion spring 335 is coiled about the rockshaft and has one end engaging a pin 336 on the arm 329 and the other end engaging a pin 337 on the arm 334. The spring therefore tends to turn the arm counterclockwise, which movement is controlled by engagement of the pin 337 thereon with the arm 330 of the three-armed member which, being fixed to the rockshaft 324, allows it to move counterclockwise when the rockshaft is turned in that direction.

The arm 332 is connected by a link 338 to the ball-ended pin 310 forming the joint of the hammer toggle 306, 308, and on the arm 332 is a lug 339 which lies between stop screws 340, 341 on the arms 328, 329, respectively, of the three-armed member.

Movement of the operating arm 326 counterclockwise (Fig. 4) will therefore cause the screw 340, after an adjustable amount of lost motion, to engage the lug 339 and move the arm 332 in a direction to break the toggle 306, 308 and move the hammer 300 out of operative position. Reverse movement of the arm 326 will cause the screw 341 to engage the lug 339 and straighten the toggle 306, 308 to render the hammer 300 operative.

Figure 2:
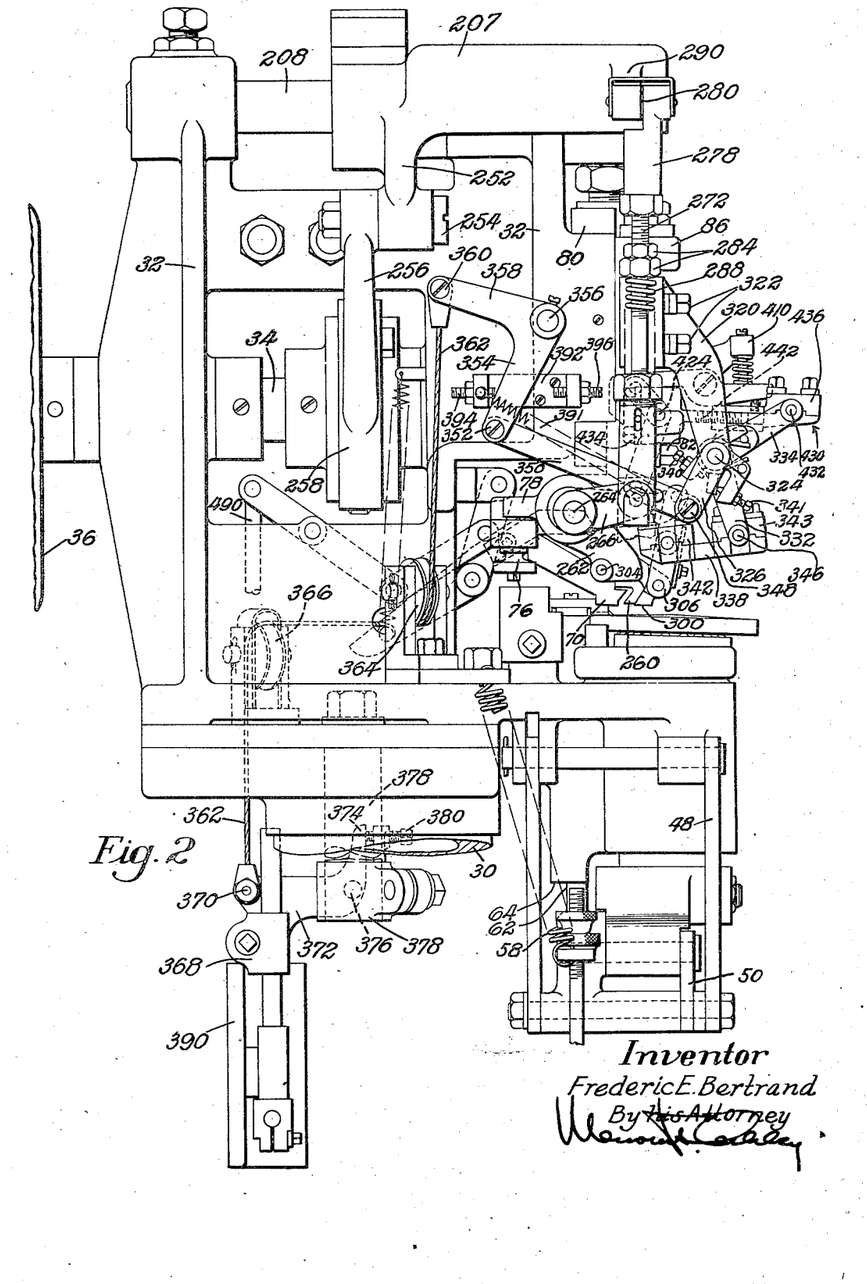
Fig. 2 is an elevation of the machine from the left-hand side with the work table depressed.

With the hammer toggle straight, as shown in Fig. 2, it will be seen that considerable movement of the operating arm 326 is possible before the screw 340 will engage the lug 339 and hence before disturbing the straight position of the toggle. During this initial movement of the operating arm, the arms 330, 334 will be moved counterclockwise, being held together by the spring 335. This initial movement of the arm 334 is utilized to control the slashing function of the knife 132. Further movement of the arm 334 causes the knife to perform its trimming function, as will be hereinafter explained.

The link 338 comprises a bar having a hemispherical recess in each end and cap pieces 342, 343 having similar recesses. The ball end of the pin 310 is fitted in the recess in the inner end of the bar or link 338 and is held by the cap piece 342 which is secured over it by screws 344. The cap piece 343 is similarly connected to the bar 338 over a ball on the end of a pin 346 fixed to the arm 332.

The operating arm 326 (Fig. 4) is pivoted at 348 to a link 350 the opposite end of which is pivoted at 352 to an arm 354 of an angle lever pivoted at 356 to the frame 32, the other arm 358 of the angle lever being pivoted at 360 to a cable 362. The cable passes under a pulley 364 to the right-hand side of the machine and then over a pulley 366 (Fig. 2) to a knee lever 368 to which it is fixed at 370. The lever 368 has a lateral portion 372 with an upright extension 374. The lateral portion 372 is fulcrumed at 376 to a strut 378 depending from the frame 32, its clockwise movement being limited by a stop screw 380 on the strut 378 in position to engage the upward extension 374. The knee lever 368 is provided with a vertically and laterally adjustable pad 390 movement of which toward the right will move the link 38 forwardly to break the toggle 306, 308 and thus move the hammer 300 out of operative relation to the presser 260 without affecting the operation of the presser. Upon release of the knee lever 368, a tension spring 391 (Fig. 2) connected between a pin on the link 350 and a pin on a bracket 392 secured to the frame 32 (Fig. 4) reacts to straighten the toggle 306, 308 and restore the hammer 300 to operative position.

Movement of the angle lever 354, 358 clockwise, or in toggle-straightening direction, in response to the spring 391, is adjustably limited (Fig. 2) by a stop screw 394 engaging the arm 354 and in the opposite direction by a stop screw 396, the stop screws being threaded through ears on the bracket 392.

The arm 334 loose on the rockshaft 324 is connected to means for controlling the action of the slashing and trimming knife 132. Secured at 400 to the yoke 184 (Figs. 1 and 5) is a bracket 402 to which is pivoted at 404 a lever 406. The upper part of the bracket 402 has two ears 408, 410 (Fig. 22) overhanging the lever 406, the ears being threaded to receive respectively screws 412, 414. The screw 412 limits clockwise movement of the lever and the screw 414 may limit counterclockwise movement thereof or may be backed off to permit some movement of the lever. A compression spring 416 on the screw 414, however, holds the lever against the screw 412. In use, both screws will be set up against the lever to hold the lever 406 positively against movement on its pivot 404.

Pivoted at 420 to one end of the lever 406 is a link 422 and to this is pivoted by a pin 424 having a ball end, a second link 426 which has a hole in its lower end to engage a pin 428 on the knife 132 (Fig. 13). The ball pin 424 (Fig. 22) at the joint of the toggle 422, 426 is connected by a link 430 to a ball-ended pin 432 on the arm 334. The ball ends of pins 424, 432 are secured to the link 430 by cap pieces 434, 436 in a manner similar to that described with respect to the link 338. The link 430, however, is provided with a lengthwise adjustment. The cap piece 434 is fastened to a member having a threaded stem 442 which is screwed into a hexagonal sleeve 444 having the outer part of its hole unthreaded. Into the unthreaded part of the hole projects a stem 446 on a member 448 to which the outer cap piece 436 is secured. The sleeve 444 is held by a set screw 450 to the stem 446 by loosening which the sleeve may be turned to vary the length of the link.

It will now be apparent that in operating along a straight, or nearly straight, side of an insole the parts will be positioned as shown in Fig. 22, the toggle 306, 308 being straight to hold the hammer 300 in operative position to engage the inner margin of the strip S and the toggle 422, 426 being broken to render the slashing and trimming knife 132 inoperative. The arms 330 and 334 act as one, the spring 335 which holds the pin 337 on the arm 334 against the arm 330 preventing breakage should movement of the knife 132 for any reason be obstructed when the knee lever is actuated to straighten the toggle 422, 426. In that case, the spring 335 will yield and the toggle would not be straightened. Initial counterclockwise movement of the rockshaft 324 by the knee lever will swing the arm 330 counterclockwise and also the arm 334 which is held against it by the spring 335 to partially straighten the toggle 422, 426 and cause cooperation of the longer edge 150 of the knife 132 with the knife edge 156 on the strip guide shell 108 to slash the thinner portion of the inner flange of the strip S (Fig. 20). The screw 340 (Fig. 22) is set to permit this partial straightening of the knife toggle before the screw engages the lug 339 and hence before the straight position of the hammer toggle 306, 308 is disturbed, thus permitting the hammer 300 to remain in position to press down the slashed margin of the strip.

However, when the knee lever 390 is moved as far as permitted by engagement of the arm 354 with the stop screw 396, the knife toggle will be completely straightened, the upper link 422 of the toggle then engaging a surface 451 on the lever 406 to cause the edge 154 of the knife 132 (Fig. 14) also to cooperate with the edge 158 on the strip guide shell 108 to make an L-shaped cut in the margin of the strip, which action, being repeated after each feed movement, will trim away that portion of the strip completely, as shown at the toe end of the insole in Fig. 20. During the same movement of the knee lever the screw 340 will engage the lug 339 and break the hammer toggle to prevent action of the hammer 300 on the trimmed-off pieces.

Since, as described, the bracket 402 (Fig. 3) is on the yoke 184, it will receive positive up-and-down movement from the eccentric pin 216 on the main shaft 34, which movement, when the toggle 422, 426 is straight, will be communicated to the knife, the positions of the cutting edges 150, 154 of the knife being determined by adjustment of the screws 412, 414. The edges 156, 158 which co-operate with the knife edges are integral with the strip guide shell 108 and the feed foot 180 the vertical downward movement of which is terminated by engagement with the insole W. This arrangement causes a relative movement between the edges 150, 154 of the knife and the edges 156, 158 of the shell of the strip guide, causing the knife to cut through the margin of the strip, making an L-shaped slash therein. That is, the downward movement of the yoke 184 carrying the bracket 402 acts through the straightened toggle 422, 426 on the knife 132 to move it down relatively to the now stationary strip guide shell 108, causing the knife edges 150, 154 to cooperate with the edges 156, 158 on the strip guide shell 108 (Fig. 14) and cut an L-shaped slash in the inner margin of the strip S just as it leaves the strip guide and before it is pressed on the insole. If the toggle 422, 426 is broken slightly, the relative movement between the knife and the co-operating edges will be less and only the knife edge 150 will engage the strip and, cooperating with the edge 156, will merely cut a straight slash from its edge inwardly, the slashing being done, of course, just as the strip leaves the strip guide and before it is acted upon by the presser 260 and hammer 300. Thus, the slashed strip is free to be conformed to the curvature of the insole before it is attached thereto. When the toggle 422, 426 is straight and the margin of the strip is being cut away, the toggle 306, 308 will be broken and the hammer 300 will be inoperative so as not to engage the cut-off pieces and cause them to adhere to the insole. The presser 260, however, will continue to operate on the thicker portion of the flange and cause it to be attached to the insole.

It is to be understood that the insole W (Fig. 20) will be prepared by having pressure-responsive cement applied to the marginal portion of its surface, at least from the breast line around the forepart to the breast line, and that the strip S will have similar cement on its attaching face. The strip S will be threaded through the slot 100 (Fig. 8) in the strip guide far enough to be engaged by the surface 72 (Fig. 7) of the yielding presser 70 when the table is raised. By depressing the treadle 52 to raise the table, the outer flange of the strip is gripped against the insole. The machine is then started and the inner flange of the strip laid by the presser 260 and the hammer 300 on the insole in a location determined by the edge gage 66 which is set to locate the strip farther inwardly of the insole in the shank portion than around the forepart. When the curved ball portion of the insole is reached, the edge gage will be shifted forwardly to locate the strip nearer the edge of the insole and, if desired, the knee lever may be moved slightly toward the front of the machine to cause the edge 150 of the knife 132 to slit the wide margin of the strip while the margin will be pressed flat by the combined action of the presser and hammer. As the relatively straight side of the forepart is reached, the action of the knife will be discontinued and when the toe is reached the knee lever will be moved again and farther in the same direction as before to cause the hammer 300 to be thrown out of action and to cause both of the knife edges 150, 154 to come into action, the cut beginning at the free or front edge of the edge 150 extending progressively toward the angle between the knife edges and then along the edge 154 to its free or right-hand end, thus completing an L-shaped cut. After the next feed movement of the insole has been effected by movement of the feed foot 180, the knife will again operate in the same manner and, since the feed movement is equal to or less than the length of the edge 154, a rectangular chip will be severed from the thinner portion of the inner flange of the strip. Since the hammer 300 is now inoperative, there is no danger of the chips being pressed upon the cemented surface of the insole and they are free to be removed. Along the second side of the forepart the knife will be thrown out of operation and the strip will be laid as at the first side of the forepart and, when the ball portion is reached, the knife may be caused to make a few slashes to facilitate laying the strip at the ball curve. The knee lever will now be released and the edge gage will be shifted to its first position for laying the strip along the shank portion to the breast line, and when that is reached the machine will be stopped.

Figure 15:
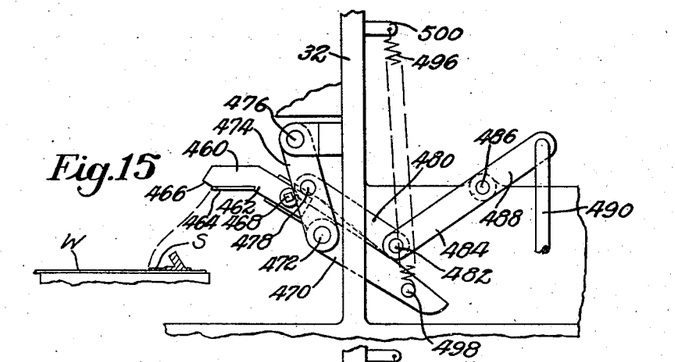
Figs. 15, 16 and 17 are views, taken from the right-hand side of the machine, of the knife for severing the strip on the insole and show successive positions of the knife as it is operated.
Figure 16:
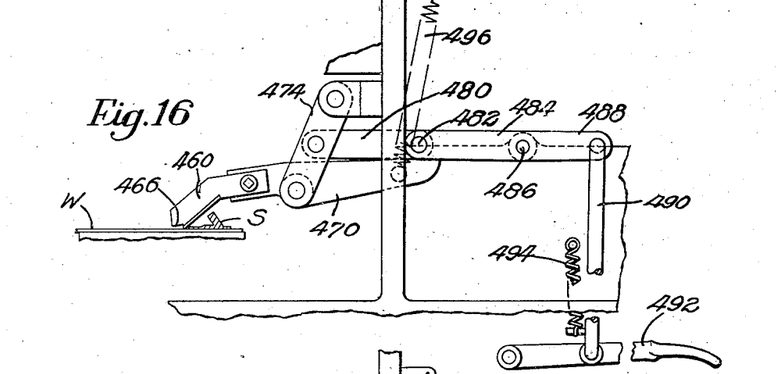
Figure 17:
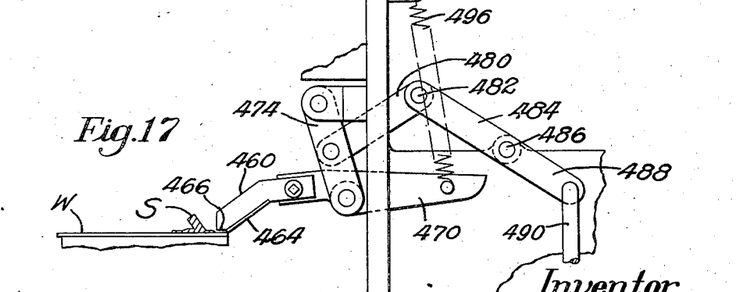

It is now necessary to sever the strip and for this purpose a knife and operating mechanism therefor, as shown in Figs. 15, 16 and 17, are provided. The knife comprises a blade 460, an angular shank 462, a cutting edge 464 and a non-cutting portion 466. The shank 462 is secured at 468 to a lever 470 pivoted between its ends at 472 to a lever 474 fulcrumed at 476 to an ear on the frame 32. Between its ends the lever 474 is pivoted at 478 to a link 480 the other end of which is pivoted at 482 to an arm 484 of a lever fulcrumed at 486 on the frame 32 and having a rear arm 488 which is connected to a treadle rod 490 leading to a treadle 492, the treadle rod being held raised by a spring 494. A tension spring 496 weaker than the spring 494 is connected between a pin 498 on the lever 470 and a pin 500 on the frame 32. The spring holds the rear arm of the lever 470 against the joint 482 connecting the link 480 to the arm 484. Partial depression of the treadle will move the mechanism from the position shown in Fig. 15 to that shown in Fig. 16, during which movement the spring 496 holds the lever 470 against the joint 482. The knife, when in this position, projects forwardly through a space between the presser 260 and the knife carrier 106 and over the insole beyond the inner edge of the strip. Further depression of the treadle moves the joint at 482 away from the lever 470, leaving the knife 460 held against the work by the spring 496, and still further depression of the treadle causes the knife to move bodily rearwardly of the machine and transversely across the strip to sever it. The edge 464 of the knife cuts through the material of the strip and is prevented from cutting into the insole by the non-cutting portion 466. The cut extends across the strip, severing the rib R and the outer flange, the knife stopping with the non-cutting edge portion resting on the insole. The translation of the knife during its cutting stroke is effected by the upward bending of a toggle comprising the link 480 and the arm 484, as will be clear from Fig. 17. When the treadle is released, the knife mechanism returns to its original position, as shown in Fig. 16.

Figure 18:
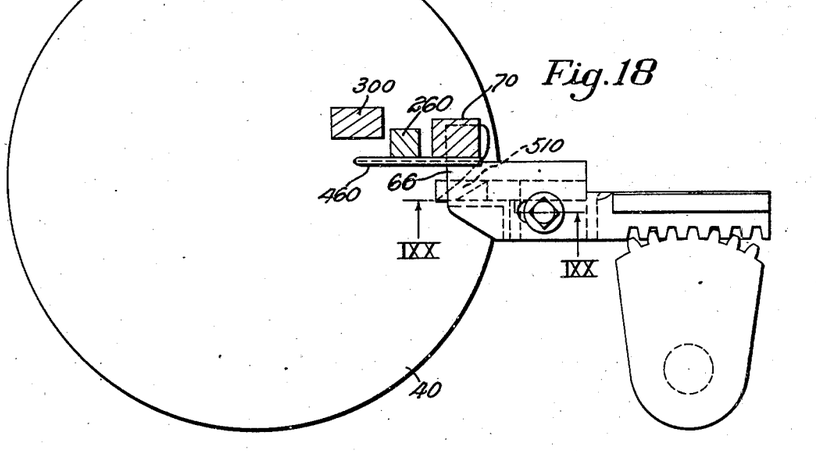
Fig. 18 is a plan view of the edge gage and knife for removing the edge corner of the insole.
Figure 19:
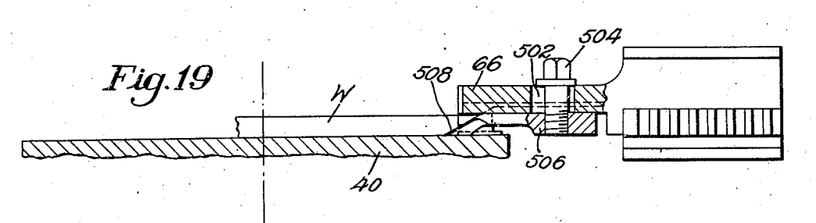
Fig. 19 is a view, partly in section, of the parts shown in Fig. 18, taken from the right-hand side.

In connection with the operation of applying the strip to the insole, it is desirable to remove from the insole the corner of the edge face which is adjacent to the table 40. For this purpose the device shown in Figs. 18 and 19 is provided. The edge gage 66 has a toothed shank connected with mechanism operated by the handle 68 (Fig. 1) for moving the gage toward and from the center of the work table 40, as disclosed in my prior Patent No. 2,326,119 above referred to. The edge gage is slotted at 502 and through the slot extends a cap screw 504 threaded into a knife 505, the screw holding the knife firmly against the under side of the edge gage and permitting adjustment of the knife substantially radially of the table. The outer end of the knife 506 is formed with a cutting edge 508 at an angle of about 30 degrees to the plane of the table and so disposed with respect to the insole-engaging face of the edge gage that, as the insole is fed along in contact with the edge gage, the lower corner of the edge face of the insole will be chamfered off. The chip removed by the knife passes out from under the edge gage through a groove or passage 510 on the under side of the edge gage, said passage having outwardly flaring side walls to afford free passage for the strip.

Having thus described my invention, what I claim as new and desire to secure by Letters Patent of the United States is:

1. In a machine for applying ribbed strips to insoles, means for supporting and feeding the insole, means including a guide for feeding the strip, and means carried by the guide for slashing the strip.

2. In a machine for applying strips to insoles, an insole support, means for pressing the strip on the margin of the insole, a guide for the strip above the support, means in the guide for feeding the strip, and means carried by the guide for slashing a margin of the strip.

3. In a machine for applying strips to insoles, an insole support, means for pressing the strip on the margin of the insole, a guide for the strip above the support, feed pawls in the strip guide, means for operating the guide to feed the strip and the insole, and means carried by the guide for slashing a margin of the strip.

4. In a machine for applying flanged, ribbed strips to insoles, means for pressing the flanges of the strip on the insole, a guide for the strip, a knife having a cutting edge on its lower end and mounted for reciprocation approximately in a vertical direction adjacent to said guide, and means for relatively operating the knife and guide to slash one of the flanges of the strip prior to the operation of the pressing means.

5. In a machine for applying strips to insoles, an L-shaped knife mounted for reciprocation in approximately a vertical direction, and means for operating the knife to one extent to slash one of the margins of the strip or to a greater extent to remove it.

6. In a machine for applying ribbed strips having two attaching flanges to insoles to form a sewing rib thereon, a guide for the strip, means for pressing both flanges of the strip on the insole to cause them to adhere thereto, means for feeding the insole, and means operable at will when applying the strip along the curved edges of the insole for slashing the inner flange of the strip.

7. In a machine for applying flanged, ribbed strips to insoles to form sewing ribs thereon, means for applying the flanges to one face of an insole with the rib lying parallel to the edge of the insole, means for feeding the strip, and means between the applying means and the strip-feeding means for slashing one of the flanges of the strip.

8. In a machine for applying flanged, ribbed strips to insoles to form sewing ribs thereon, means for progressively bringing the insole and the strip into contact along a line generally similar to the outline of the insole, and means for cutting successive slashes across one of the flanges of the strip prior to its being brought into contact with the insole.

9. In a machine for applying ribbed strips having flanges to insoles, means for pressing the flanges upon the insole, means for feeding the strip step by step, means for feeding the insole at a less rate than the strip is fed, and means for slashing one flange of the strip in timed relation to the feeding steps.

10. In a machine for applying flanged, ribbed strips to insoles, means for pressing the flanges upon one face of the insole so that the rib extends in a line generally similar to the shape of the insole, and means comprising inclined cutting edges for slashing the inner flange progressively from its edge toward the base of the rib.

11. In a machine for applying flanged, ribbed strips to insoles to form sewing ribs thereon, means for applying the flanges to one face of the insole with the rib lying substantially parallel to the edge of the insole, and means for slashing one of the flanges at points near together and along lines extending transversely of the flange toward the rib prior to application of the slashed portion of the strip to the insole.

12. In a machine for applying strips to insoles, an L-shaped knife mounted for endwise reciprocation with one portion of its edge substantially perpendicular to the direction of feed and another portion extending in the direction of feed, and means for imparting to the knife different extents of reciprocation whereby one or both portions of the knife come into action on the marginal portion of the strip.

13. In a machine for applying strips to insoles, means for supporting an insole, means for pressing the strip upon the insole, a guide for the strip, a feed pawl in the guide, a feed foot on the guide, means for imparting a four-motion movement to the guide to feed the strip and the insole, and a knife on the guide for slashing the strip.

14. In a machine for adhesively applying flanged, ribbed strips to insoles to form sewing ribs thereon, a guide for the strip, means for feeding the insole, means for pressing a flange of the strip on the insole, a knife mounted for reciprocation in a direction substantially perpendicular to the plane of the insole, said knife having a cutting edge extending transversely of the line of feed, and means for reciprocating the knife to cause it to slash the flange.

15. In a machine for applying flanged, ribbed strips to insoles to form sewing ribs therein, a guide for the strip, means for feeding the insole, means for pressing the flange of the strip on the insole, a knife mounted for reciprocation in a direction substantially perpendicular to the plane of the insole, said knife having a cutting edge extending substantially in the direction of the line of feed, and means for reciprocating the knife to cause it to cut through the flange longitudinally thereof.

16. In a machine for applying to insoles ribbed strips having inner and outer flanges, a guide for the strip, means for pressing the flanges upon the insole, and a vertically reciprocating knife having an L-shaped cutting edge adjacent to the guide, said guide having thereon edges cooperating with the edge of the knife.

17. In a machine for applying flanged, ribbed strips to insoles, a guide for the strip, means for pressing the strip upon the insole, a vertically reciprocating knife having an L-shaped cutting edge adjacent to the guide, said guide having thereon edges co-operating with the edges of the knife, and means for adjusting the co-operating edges to secure a proper cutting relation between them.

18. In a machine for applying to insoles ribbed strips having inner and outer flanges, a guide for the strip, means for pressing the flanges upon the insole, a vertically reciprocating knife having an L-shaped cutting edge adjacent to the guide, said guide having thereon edges co-operating with the edge of the knife, the knife edge and the guide edges being inclined to each other to effect a shearing cut on the strip beginning at the edge of the inner flange, and means for moving relatively the knife and said co-operating edges to varying extents whereby the strip may be slashed or trimmed off.

19. In a machine for applying to insoles ribbed strips having wide inner flanges, means for feeding the insole, means for pressing the strip on the insole adjacent to the inner side of the rib, means acting upon the portion of the strip extending inwardly beyond said pressing means for pressing that portion against the insole, and means for slashing the inner margin of the strip prior to its being acted upon by said pressing means.

20. In a machine for applying to insoles ribbed strips having narrow outer flanges and wide inner flanges, means for feeding the insole, means for pressing the narrow flange and a portion of the inner flange adjacent to the rib against the insole, means acting on a portion of said wide flange extending farther inwardly of the rib to press that portion against the insole, and means for slashing the inner margin of the wide flange.

21. In a machine for applying to insoles ribbed strips having wide inner flanges, means for feeding the insole, a presser for operating on the portion of the wide flange adjacent to the rib, a hammer mounted on said presser for treating the remainder of said flange, and means for throwing the hammer into and out of operation.

22. In a machine for applying to an insole a ribbed strip having a wide inner margin, a presser acting to force against the insole a portion of said inner flange adjacent to the rib, a hammer mounted on said presser in position to act upon the remainder of said flange, a guide for the strip, an L-shaped knife carried by the guide, and means for simultaneously moving said hammer out of operative position and rendering the knife operative to remove the portion of the strip which would otherwise be acted upon by the hammer.

23. In a machine for adhesively applying strips along the marginal surfaces of work pieces having portions with sharply curved edges, the combination of intermittently acting means for pressing the margin of the strip which is on the inner side of the curved edges and in which wrinkles would be formed by bending the strip laterally to follow said curve, an L-shaped knife, and means for discontinuing the operation of said pressing means and simultaneously causing operation of the knife to remove the inner portion of the strip in which wrinkles would otherwise be formed.

24. In a machine for applying to an insole a ribbed strip having a wide inner flange, means for pressing the strip upon the insole adjacent to the rib, separate means for pressing the inner margin of the strip upon the insole, a guide for the strip, an L-shaped knife carried by the guide, means for causing the action of said separate means to be discontinued, and means for simultaneously setting the knife in operation to remove the portion of the strip which would otherwise be acted upon by said separate means.

25. In a machine for applying to insoles ribbed strips having inner and outer flanges, a guide for the strip, means for pressing the flanges upon the insole, and a vertically reciprocating knife having an L-shaped cutting edge adjacent to the guide, said guide having thereon edges co-operating with the edge of the knife, the knife edge and the guide edges being inclined to each other at substantially ten degrees to effect a shearing cut on the strip.

26. In a machine for applying flanged, ribbed strips to insoles, a hammer arranged to act on one flange of the strip, a toggle through which the hammer is actuated when the toggle is straight, a knife for removing the portion of the flange acted upon by the hammer, a toggle through which the knife is operated when the toggle is straight, and operator-controlled means for breaking one toggle and straightening the other.

27. In a machine for applying flanged, ribbed strips to insoles, a hammer arranged to act on one flange of the strip, a toggle through which the hammer is actuated when the toggle is straight, a knife for removing the portion of the flange acted upon by the hammer, a toggle through which the knife is operated when the toggle is straight, operator-controlled means for breaking one toggle and straightening the other, and yielding means between the knife toggle and said operator-controlled means.

28. In a machine for applying a flanged, ribbed strip to insoles, a hammer arranged to operate on one flange of the strip, a toggle through which the hammer is operated when the toggle is straight, a knife for removing the portion of the flange acted upon by the hammer, a toggle through which the knife is operated when the toggle is straight, operator-controlled means for breaking one toggle and straightening the other, and means permitting the knife toggle to be partly straightened prior to breaking the hammer toggle.

29. In a machine for applying flanged, ribbed strips to insoles, an oscillating hammer acting on the margin of the strip, a toggle through which the hammer is operated, a knife for slashing the flange, a toggle through which the knife is operated, and manually operated means for breaking one toggle and straightening the other.

30. In a machine for applying flanged, ribbed strips to insoles, an oscillating hammer acting on a flange of the strip, a toggle through which the hammer is operated, a knife for slashing the flange, a toggle through which the knife is operated, and means for breaking one toggle and straightening the other, said means being constructed and arranged partially to straighten the knife toggle to cause the knife to slash the flange without affecting the hammer toggle.

31. In a machine for applying flanged, ribbed strips to insoles, an oscillating hammer acting on the margin of the strip, a toggle through which the hammer is operated, a knife for slashing said margin, a toggle through which the knife is operated, a rockshaft having arms thereon, one arm being connected to the hammer toggle and another arm being connected to the knife toggle, means for turning the rockshaft to straighten one toggle and break the other, and means arranged to permit the knife toggle to be partly straightened prior to breaking of the hammer toggle.

32. In a machine for applying to insoles a ribbed strip having a wide inner flange, a pair of pressers acting on the wide flange one near the rib and the other inwardly of the rib, a knife for removing the part of the strip acted on by the inner presser, and means for throwing the inner presser out of operation and simultaneously causing the knife to operate.

33. In a machine for adhesively applying strips along the curved edges of work pieces, the combination of intermittently acting means for causing the strip to adhere to the work piece, and means comprising cooperating cutting edges relatively operable at the option of the operator for removing a portion of the strip in which wrinkles would otherwise be formed by bending the strip laterally to follow the curved edge of the work piece.

34. In a machine for adhesively applying strips along the marginal surfaces of work pieces having portions with sharply curved edges, the combination of intermittently acting means for pressing the margin of the strip which is on the inner side of the curved edge and in which wrinkles would be formed by bending the strip laterally to follow a sharply curved edge, and means for discontinuing the operation of said pressing means and simultaneously causing the inner portion of the strip in which the wrinkles would be formed to be removed.

35. In a machine for applying a ribbed strip having a wide inner margin to an insole, means for pressing the strip upon the insole at each side of the rib, separate means for pressing the inner margin of the strip upon the insole, means for feeding the insole, means for causing the action of said separate means to be discontinued, and means simultaneously set in operation for removing the portion of the strip which is acted upon by said separate means when it is in operation.

36. In a machine for adhesively applying strips along the marginal surfaces of work pieces having portions with sharply curved edges, the combination of intermittently acting means for pressing the margin of the strip which is on the inner side of the curved edge and in which wrinkles would be formed by bending the strip laterally to follow a sharply curved edge, an L-shaped knife, and means for discontinuing the operation of said pressing means and simultaneously causing operation of the knife to remove the inner portion of the strip in which the wrinkles would otherwise be formed.

37. In a machine for applying a ribbed strip having a wide inner margin to an insole, means for pressing the strip upon the insole at each side of the rib, separate means for pressing the inner margin of the strip upon the insole, a guide for the strip, an L-shaped knife carried by the guide, means for operating the knife, means for feeding the insole, means for causing the action of said separate means to be discontinued, and means simultaneously setting the knife in operation to remove the portion of the strip which is acted upon by said separate means when it is in operation.

38. In a machine for applying ribbed strips to insoles, a strip guide, means for advancing the strip through the strip guide step by step, a reciprocating knife having a cutting edge extending transversely of the strip at right angles to its direction of feed, and an edge on the guide inclined to the knife edge whereby the reciprocation of the knife slashes the strip with a shear cut.

39. In a machine for laying strips on insoles, means for guiding the strip into proper relation to a supported insole, means for pressing the strip on the insole, and a knife carried by the guiding means and arranged for movement across the plane of the strip, the knife having an L-shaped cutting edge on its lower end arranged to co-operate with surfaces on the guiding means, said surfaces being so related to the edges of the knife that the knife effects a progressive shearing cut from one end of its cutting edge to the other.

40. In a machine for adhesively applying flanged strips along the marginal surfaces of work pieces, the combination of means for continuously pressing the outer flange on the insole, intermittently acting means for pressing the inner flange of the strip, and means for discontinuing the operation of said pressing means on a part of the width of the inner flange.

41. In a machine for applying ribbed strips having narrow outer and wide inner flanges to insoles, yielding means for pressing the outer flanges upon the insole, pressers carried by the yielding means for pressing different lateral portions of the inner flange of the strip upon the insole, and means for operating the pressers.

42. In a machine for applying ribbed strips having narrow outer and wide inner flanges to insoles, yielding means for pressing the outer flange upon the insole, pressers carried by the yielding means for pressing different lateral portions of the inner flange of the strip upon the insole, means for operating the pressers in unison, and operator-controlled means for discontinuing the operation of one of the pressers.

43. In a machine for operating on insoles, means for applying a ribbed strip to the marginal portion of an insole to form a sewing rib thereon, means for removing a portion of the strip, and means for removing a corner of the edge face of the insole.

44. In a machine for applying ribbed strips to insoles, means for progressively applying a ribbed strip to one side of an insole, means for progressively slashing the strip, and means for simultaneously removing progressively the corner of the edge face of the insole on its other side.

45. In a machine for applying ribbed strips to insoles, means for progressively applying a ribbed strip to the upper side of an insole, an edge gage for the insole, means for urging the insole toward the edge gage, and a knife carried by the edge gage having a cutting edge inclined to the acting face of the edge gage for removing the lower corner of the edge face of the insole simultaneously with the application of the strip.

46. In a machine for applying ribbed strips to insoles, means for pressing the strip on the insole, a guide for presenting the strip, a knife arranged to move between the presser and the guide transversely of and above the strip to engage the insole at a point beyond the strip and then to move outwardly of the insole to sever the strip, a toggle, and connections from said toggle to the knife to effect the specified movements.

47. In a machine for applying ribbed strips to insoles, means for pressing the strip on the insole, a guide for presenting the strip, a knife, and means constructed and arranged to move the knife between the presser and the guide transversely of and above the strip to engage the insole at a point beyond the strip and then to move the knife outwardly of the insole to sever the strip.

48. In a machine for applying ribbed strips to insoles, means for pressing the strip on the insole, a guide for presenting the strip, a knife, means constructed and arranged to move the knife between the pressing means and the guide transversely of and above the strip to engage the insole at a point beyond the strip and then to move the knife outwardly of the insole to sever the strip, and a non-cutting surface adjacent to the end of the knife edge to prevent cutting into the insole while permitting the knife edge to sever the strip.

49. In a machine for applying ribbed strips to insoles, means for pressing the strip on the insole, a guide for presenting the strip, a knife arranged to move between the presser and the guide transversely of and above the strip to engage the insole at a point beyond the strip and then to move outwardly of the insole to sever the strip, a spring for causing downward movements of the knife, and a toggle arranged to effect to-and-fro and upward movements of the knife.

50. In a machine for applying a strip to an insole, a rotary table for supporting the insole, means for pressing the strip upon the insole, a knife movable radially of the table toward its center out of contact with the strip, then into contact with the insole and then from the center of the table to sever the strip, a lever for guiding the knife in its radial movement, a toggle for effecting movements of said lever, and means including the toggle and a spring for controlling the heightwise movements of the knife.

51. In a machine for applying strips to insoles, a strip guide, means for pressing the strip on the insole, a knife for severing the strip arranged to move forwardly between the pressing means and the strip guide out of contact with the insole, then downwardly into contact therewith and then rearwardly to sever the strip, a single toggle, and levers connected therewith whereby the recited movements of the knife are effected by first straightening and then breaking the toggle.

52. In a machine for applying strips to insoles, a strip guide, means for pressing the strip on the insole, a knife for severing the strip movable in a vertical plane between the strip guide and the pressing means and having a cutting edge at an acute angle to the plane of the insole, a lever carrying the knife, a lever guiding the knife for movement in said plane, a single initially bent, manually operated toggle connected to the guiding lever for effecting forward and rearward movements of the knife by first straightening the toggle and then breaking it, and a spring connected to the knife lever tending to effect movement of the knife toward the insole, said toggle when operated acting to control vertical movement of the knife toward the insole and when released acting to move the knife vertically away from the insole.

53. In a machine for applying strips to insoles, a strip guide, means for pressing the strip on the insole, a knife for severing the strip movable in a vertical plane between the strip guide and the pressing means, a lever on which said knife is mounted, said lever extending at an obtuse angle to the knife edge, a swinging lever supporting said knife lever for movement in a plane extending transversely of the rib, a horizontal toggle connected to said swinging lever normally broken downwardly and engaging said knife lever, a spring tending to hold the knife lever against the toggle, and means for first straightening the toggle and then breaking it upwardly whereby the knife is moved in a vertical plane over the strip out of contact therewith, then down against the insole and then across the strip to sever it.

FREDERIC E. BERTRAND.

Certificate of Correction

Patent No. 2,410,004.

October 29, 1946.

FREDERIC E. BERTRAND

It is hereby certified that errors appear in the printed specification of the above numbered patent requiring correction as follows: Column 8, line 55, for "pressure" read *presser*; column 9, line 30, after "operating" insert *arm*; column 10, line 25, for the reference numeral "38" read *338*; column 19, line 6, claim 41, for "flanges" read *flange*; and that the said Letters Patent should be read with these corrections therein that the same may conform to the record of the case in the Patent Office.

Signed and sealed this 24th day of June, A. D. 1947.

[SEAL]

LESLIE FRAZER,
*First Assistant Commissioner of Patents.*